(No Model.)
E. TRIELOFF.
TOBACCO PIPE.
No. 288,382. Patented Nov. 13, 1883.
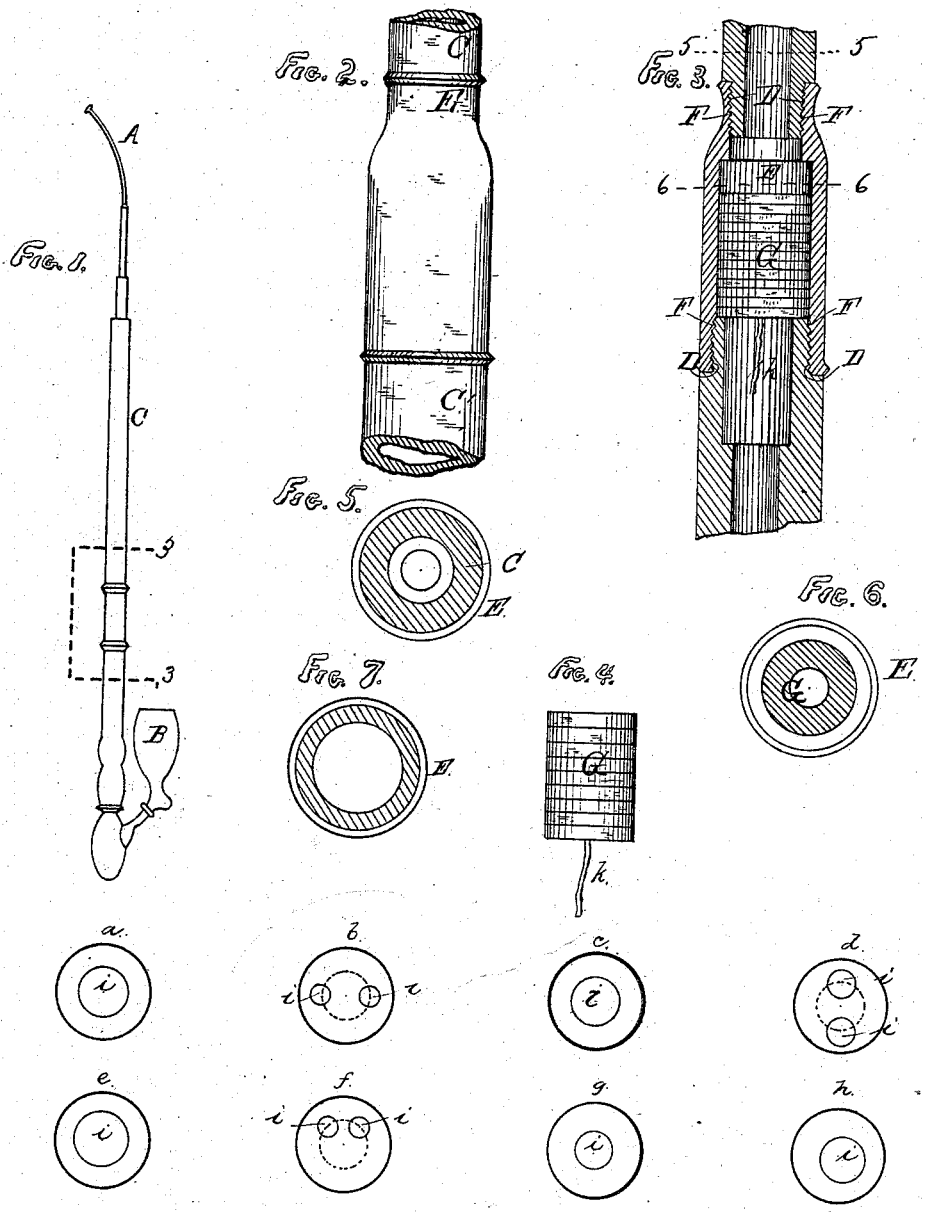

United States Patent Office.

ERNST TRIELOFF, OF CASSEL, PRUSSIA, GERMANY.

TOBACCO-PIPE.

SPECIFICATION forming part of Letters Patent No. 288,882, dated November 13, 1883.

Application filed April 21, 1883. (No model.)

*To all whom it may concern:*

Be it known that I, ERNST TRIELOFF, of the city of Cassel, in the Kingdom of Prussia and German Empire, have invented certain new and useful Improvements in Tobacco-Pipes, of which the following is a specification.

My invention relates to pipes for smoking tobacco; and it consists in providing a sectional pipe-stem with a nicotine-absorbing plug composed of a series of perforated felt disks connected together, with the perforations of each disk out of alignment with the perforations of the disk adjacent thereto, as hereinafter described and claimed.

In the drawings, Figure 1 represents a side elevation of a pipe having my improvements combined therewith. Fig. 2 represents to an enlarged scale a side elevation of a portion of the pipe-stem with the chamber, hereinafter described, for receiving the absorbent material, attached thereto. Fig. 3 represents to an enlarged scale a vertical section on the line 3 3 of Fig. 1. Fig. 4 represents in side elevation the nicotine-absorbing cartridge, hereinafter described. Fig. 5 represents a horizontal section on the line 5 5 of Fig. 3. Fig. 6 represents a horizontal section on the line 6 6 of Fig. 3. Fig. 7 represents a horizontal section of the empty cartridge-chamber.

The diagrams $a$ to $h$, inclusive, represent a series of felt disks which are perforated in irregular locations, substantially as shown, and which are sewed together to form a complete cartridge, as hereinafter described.

A represents the mouth-piece, B the bowl, and C the stem, of the pipe, which latter is constructed in sections, as shown, with an external screw-thread, D, at the inner end of each section.

E represents the cartridge-chamber within which the nicotine-absorbing cartridge is contained. This chamber E is provided at each end with an internal screw-thread, F, by means of which it and the sections of the pipe-stem C are connected together, as shown in Fig. 3, with capability of ready removal from each other whenever it is necessary to clean the pipe, withdraw and clean or substitute another cartridge, or for any other reason. The chamber E may be formed of any suitable material—such, for instance, as horn, vulcanite, &c.

G represents the cartridge or nicotine absorber or collector. This cartridge is composed of a series of woolen felt disks, (shown in plan view by the diagrams $a$ to $h$, inclusive,) and each of which have vertical perforations $i$ formed therein in irregular positions, so that upon said disks being placed in position with their faces resting against each other, as shown in Figs 3 and 4, the perforations in each disk will be out of alignment with the perforations in the disk next adjacent thereto. By this means the smoke will be compelled to pass between and through the imperforate, as well as the perforated portions of the respective disks, thereby insuring a much more complete and certain filtration of the smoke and the elimination therefrom and absorption by said disks of the nicotine and fluid contained in such smoke. These disks, when placed in juxtaposition, are sewed or otherwise suitably attached together, and thus form a complete cartridge, to the lower end of which is attached a tape, $k$, by means of which the cartridge may be withdrawn from the chamber without soiling the fingers, as by the time the filtered smoke has reached the lower end of the cartridge it will be purged from the impurities suspended therein on its first contact with the cartridge. The bore at the upper end of the lower section of the pipe-stem is slightly larger than is the bore of the remaining portion of the stem, to admit of the tape resting therein without impeding the passage of the smoke. The two disks are designed to be of a circumference corresponding, or nearly so, with the inner circumference of the cartridge-chamber, and when in position the lower end of the cartridge will rest upon and against the upper end of the lower section of the pipe-stem, as clearly shown in Fig. 3. By constructing the disks forming the cartridge of woolen felt I obtain a nicotine-absorbent which is neither changed by the moisture deposited or by frequent washing after use. By perforating such disks in the manner described, and arranging said disks together, so that the nicotine and other moisture has an impeded passage therethrough, the maximum of filtration of the smoke is secured, and by attaching to said cartridge a tape the same can be readily removed without the fingers or hand being soiled, and by constructing the pipe-stem in sections and forming the cartridge-chamber of non-absorbent material and adapting such chamber and pipe-stem for ready connection with and disconnection from each other the several parts can be readily removed from each other, cleaned and replaced, and when necessary a new cartridge quickly and easily placed in position.

Having thus described my invention, what I claim is—

A tobacco-pipe stem provided with a section having a chamber, E, and a series of perforated felt disks connected together, with the perforations of each disk out of alignment with the perforations of the disk next adjacent thereto, substantially as and for the purpose set forth.

ERNST TRIELOFF.

Witnesses:
FELSIO D. WYNGAERT,
CARL MÜLLER.